(12) United States Patent
Verma et al.

(10) Patent No.: US 12,506,708 B1
(45) Date of Patent: Dec. 23, 2025

(54) AIR-GAPPED SECURITY FOR REMOTE-MANAGED SITES

(71) Applicant: INTERNATIONAL BUSINESS MACHINES CORPORATION, Armonk, NY (US)

(72) Inventors: Dinesh C. Verma, New Castle, NY (US); Gerald Coon, Durham, NC (US); Mathews Thomas, Flower Mound, TX (US); Satishkumar Sadagopan, Leawood, KS (US); Utpal Mangla, Toronto (CA); Pawan Raghunath Chowdhary, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

(21) Appl. No.: 18/748,433

(22) Filed: Jun. 20, 2024

(51) Int. Cl.
 *H04L 9/40* (2022.01)

(52) U.S. Cl.
 CPC .......... *H04L 63/0209* (2013.01); *H04L 63/10* (2013.01)

(58) Field of Classification Search
 CPC .......................... H04L 63/0209; H04L 63/10
 See application file for complete search history.

(56) References Cited

U.S. PATENT DOCUMENTS

| 10,348,700 | B2 | | 7/2019 | Auradkar et al. | |
|---|---|---|---|---|---|
| 10,699,005 | B2 | * | 6/2020 | Figovsky | G06F 9/45545 |
| 11,032,131 | B1 | * | 6/2021 | Franceschetti | G06F 21/606 |
| 11,461,754 | B2 | * | 10/2022 | Crooks | G07G 1/01 |
| 11,843,501 | B2 | | 12/2023 | Perez et al. | |
| 2016/0241583 | A1 | * | 8/2016 | Kowalczyk | H04L 63/20 |
| 2018/0375826 | A1 | * | 12/2018 | Chang | G06F 3/065 |
| 2019/0278949 | A1 | * | 9/2019 | Wu | H04L 9/0643 |
| 2020/0126842 | A1 | * | 4/2020 | Topaloglu | H01L 21/7682 |
| 2022/0067685 | A1 | * | 3/2022 | Crooks | G07G 1/14 |
| 2022/0129886 | A1 | * | 4/2022 | Du | H04L 9/0894 |

(Continued)

OTHER PUBLICATIONS

"Zero Trust Data Management—A New Approach to Cyber Resilience and Enterprise Recovery", GCN, 2020, 2 pgs.

(Continued)

*Primary Examiner* — Chau Le
(74) *Attorney, Agent, or Firm* — Rakesh Roy, Esq.; Matthew M. Hulihan, Esq.; Heslin Rothenberg Farley & Mesiti P.C.

(57) ABSTRACT

Air-gapped security for a remote-managed site is provide through a system and related methods, the system including a switch component having at least one network switch, a staging component to stage data for communication between a first site, as a management site, and second site, as a target site to be managed by the management site, a mechanical component to selectively, physically connect and disconnect wired communication links to and from the switch component, and a control component to operate the mechanical component to physically disconnect a wired communication link to air-gap one site from the other site and the staging component as a prerequisite to physically connecting another wired communication link between the other site and the staging component via the switch component. Through selective connection and disconnection, secure provision of data between the first site and second site via the intermediate system is provided.

20 Claims, 5 Drawing Sheets

(56) References Cited

U.S. PATENT DOCUMENTS

2023/0012696 A1* 1/2023 Sapir .................. G06K 7/10722
2023/0252169 A1* 8/2023 Savir ..................... H04L 9/0825
                                                                        726/26
2023/0370321 A1    11/2023 Perez et al.

OTHER PUBLICATIONS

Anonymous, "Method for Dynamic Connectivity-as-a-Service (CAAS) for Storage Clouds for Air-Gapped Targets", IPCOM000269306D, IP.com, Apr. 1, 2022, 8 pgs.

Anonymous, "Novel Backup/DR Storage Air Gap Approach", IPCOM000271778D, IP.com, Feb. 8, 2023, 4 pgs.

Anonymous, "System and Method For Secure Remote Configuration of Mobile Devices Through a Secure Tunnel Using a Cloud Based Remote Manager Service", IPCOM000272568D; IP.com, Jun. 26, 2023, 6 pgs.

Anonymous, "AI Policy Recommendation Engine for Sovereign Cloud (APRESC)", IPCOM000273550D; IP.com; Dec. 26, 2023, 8 pgs.

"VMWARE Sovereign Cloud Technical Guidance for VMWARE Cloud Provider Partners", VMWARE, 2021, 31 pgs.

"Security and Privacy Controls for Information Systems and Organizations," NIST Special Publication 800-53, Revision 5, Sep. 2020, 492 pgs.

* cited by examiner

AIR-GAPPED SECURITY FOR REMOTE-MANAGED SITES

BACKGROUND

Aspects described herein relate to management of system(s) at a site, and more specifically to enhanced security when managing a remote site. For instance, an entity providing a cloud-hosted offering may not possess the expertise or desire to manage the hosting cloud systems. The entity might engage with another entity, for instance an entity providing the cloud platform or another entity, to perform management of the cloud systems.

SUMMARY

Shortcomings of the prior art are overcome and additional advantages are provided, in one aspect, through the provision of an intermediary system. The intermediary system includes a switch component having at least one network switch. The intermediary system also includes a staging component configured to stage data for communication between a first site, as a management site, and second site, as a target site to be managed by the management site. The intermediary system further includes a mechanical component configured to selectively, physically connect and disconnect wired communication links to and from the switch component. In addition, the intermediary system includes a control component configured to operate the mechanical component to physically disconnect a first wired communication link to air-gap the first site from the second site and the staging component as a prerequisite to physically connecting a second wired communication link between the second site and the staging component via the switch component. The control component is further configured to operate the mechanical component to physically disconnect the second wired communication link to air-gap the second site from the first site and the staging component as a prerequisite to physically connecting the first wired communication link between the first site and the staging component via the switch component.

Shortcomings of the prior art are overcome and additional advantages are provided, in another aspect, through the provision of a computer-implemented method. The method controlling a mechanical component of an intermediary site between a first site and a second site to selectively, physically connect and disconnect wired communication links to and from a switch component of the intermediary site. The method also enables provision of system management code from a management system of the second site to a cloud system of the first site. The enablement of provision of the system management code is accomplished by controlling the mechanical component to physically disconnect a first wired communication link and air-gap the first site from the second site and a staging component of the intermediary site, and physically connect a second wired communication link between the second site and the staging component via the switch component. The enablement of provision of the system management code is accomplished further by, based on provision of the system management code from the management system to the staging component, controlling the mechanical component to physically disconnect the second wired communication link and air-gap the second site from the first site and the staging component, and physically connect the first wired communication link, the first wired communication link being between the first site and the staging component via the switch component, for provision of the system management code to the cloud system. In addition, the method also enables provision of management data from the cloud system to the management system. The enablement of provision of the management data is accomplished by controlling the mechanical component to physically disconnect the second wired communication link and air-gap the second site from the first site and the staging component, and physically connect the first wired communication link between the first site and the staging component via the switch component. The enablement of provision of the management data is accomplished further by, based on provision of the management data from the cloud system to the staging component, controlling the mechanical component to physically disconnect the first wired communication link and air-gap the first site from the second site and the staging component, and physically connect the second wired communication link between the second site and the staging component via the switch component for provision of the management data to the management system.

Additional aspects of the present disclosure are directed to systems and computer program products configured to perform the methods described above and herein. The present summary is not intended to illustrate each aspect of, every implementation of, and/or every embodiment of the present disclosure. Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
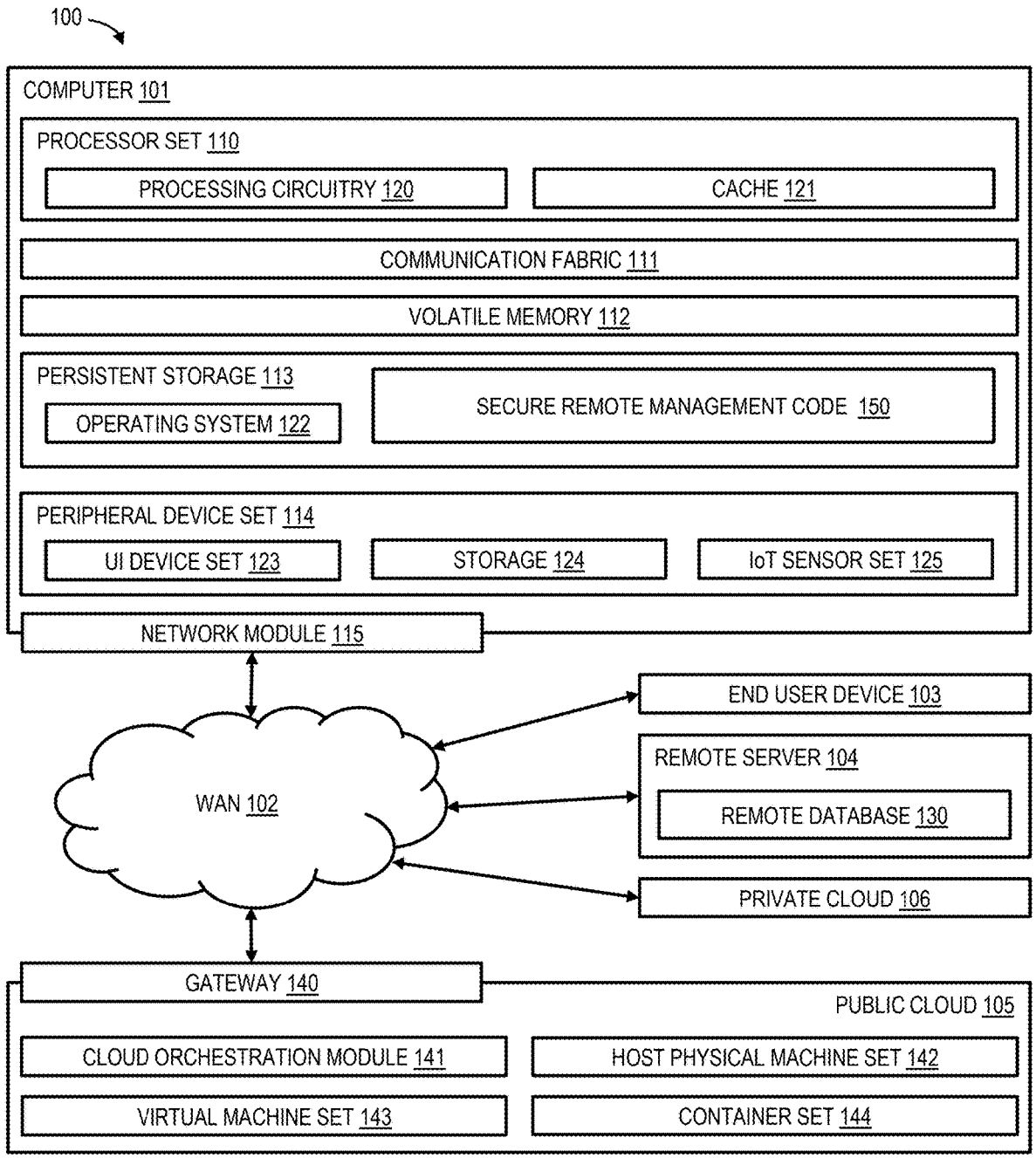
FIG. 1 depicts an example computing environment to incorporate and/or use aspects described herein.

Described herein are approaches for air-gapped security for remote-managed sites. The remote-managed site could be one or more systems hosting workload(s) of one or more tenants. In a specific example, the systems are part of a cloud infrastructure at a particular location and the tenants are tenants of the cloud infrastructure. Such tenants might not have the expertise or desire to perform necessary management of their cloud systems and hosted offerings, and therefore might enlist the help of another entity to perform this management. However, often times these entities have strict requirements surrounding data residency. This is frequently the case with a sovereign cloud offering, which is a cloud offering that is hosted for a sovereign entity, for instance to the government of a nation within that jurisdiction. There may be requirements for data to remain within the nation's jurisdiction and without the chance of leakage to a remote entity, i.e., one outside of the nation and across a data boundary that corresponds to a geographic boundary.

For entities that may or may not have the ability to manage the systems (infrastructure and/or deployed software) at a site, they might desire an arrangement in which the cloud site is managed, by managing systems thereof, remotely in a manner that prevents data leakage. For instance, the entity might want the cloud infrastructure provider itself, or some other entity, to manage the site. This can be problematic if that managing entity is located across a data boundary, for instance is located outside of the jurisdiction. By way of specific example, a first entity in a first country might desire for its cloud-based offering hosted on a cloud site within the country to be managed by a second entity. The second entity may not already have the appropriate expertise or resources within that country to provide effective management, but may have a team in second country that can travel to perform the management in the first country.

One secure approach to prevent data leakage from one system to another is for there to be an air-gap between the two systems, which provides physical isolation of the two systems from each other. In the context of a cloud site being air-gapped from other sites, this would prevent any connection from the cloud site (e.g. a system thereof) to any of the other sites. While an air-gap may be effective to secure a cloud system from a remote system, the nature of the air-gap is that it would also prevent management of the cloud system by the remote system. One example of such management is the application of a security update to the cloud system, for instance software or hardware thereof, which the air-gap would prevent from taking place because of the lack of electronic data communication between the two sites. Current approaches do not provide for secure remote management of a site across a data boundary. Instead, it is often necessary for a management team to traverse the data boundary (enter the jurisdiction, for instance) to perform the management activity such as installing software, gathering and analyzing data, or any other management activity.

One or more embodiments described herein may be incorporated in, performed by and/or used by a computing environment, such as computing environment 100 of FIG. 1. As examples, a computing environment may be of various architecture(s) and of various type(s), including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing process(es) that perform any combination of one or more aspects described herein. Therefore, aspects described and claimed herein are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing inventive methods, such as secure remote management security code 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication Fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud Computing Services and/or Microservices (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above in FIG. 1 is only one example of a computing environment to incorporate, perform, and/or use aspect(s) of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Aspects described herein provide air-gapped security for remote-managed sites. This can facilitate the management of a site, for instance to perform updates to software or equipment thereof, or perform any other management activity, in a secure manner.

Figure 2:
FIG. 2 depicts an example in which a site is remotely managed.

For context, FIG. 2 depicts an example in which a site is remotely managed. FIG. 2 shows three sites—site A 202, site B 204, and site C 206. Each site can communicate with other site(s) by way of data communication between systems of the sites. The sites communicate between each other over communication links, for instance wired/wireless data communication links. Sites A 202 and B 204 communicate over link 208 and sites B 204 and C 206 communicate over link 210. The links could be or encompass public and/or private telecommunications network(s) for data communication extending over large areas. One example network is the Internet. At a given site, the link typically physically connects to networking equipment, such as a gateway of other type of network switch, via removable cables that can be unplugged to break the communication link to systems at the site.

A "site" refers to a collection of one or more co-located systems, for instance computer systems and associated equipment for data communication (such as network switches) between those systems and other systems off site. A site could be relatively small and include a single computer system, or relatively large, for instance a datacenter with hundreds of computer systems.

In this example, a specific service offered by a first entity is provided by site C, and therefore the first entity has control over how the data is handled at site C. Site B provides a control plane for the service to manage and manipulate data going to the service at site C, and site A manages the control plane. By way of specific example, the service might be a containerized application in which the workers run on site C (e.g., a cloud system), components to manage those workers run as a control plane at site B, and these components running at site B are managed by management components at site A. In this example, a second entity might own/control the components at site A and B, while the first entity might own or otherwise have some control over components of site C, for instance at least the data at site C.

The first entity might desire the second entity (or any other entity), as a managing/management entity, to provide management of site C, for instance management of one or more systems of the site. An example of such management is installation or updating of software at site C. Another example is receipt and analysis of management data, for instance data such as log records from the target site, which may be used for analysis or other activity by the entity managing the site to facilitate its management activity. In the scenario where communication between site A and site C is not allowed, one approach is for the managing entity to send a team of individuals to site C to perform the management. This approach has drawbacks including expenditure of time and cost resources.

Another approach is for data communication to flow from site A to site C for performing the management. However, if simultaneous online communication between (i) site A and site B and (ii) site B and site C were allowed, then this could pose security risks, for instance a risk of real-time data leakage from site C to site A via site B, or a risk of a malicious actor at site A pushing compromised code (in the form of a patch, update, or the like) out to site C.

Described herein is a solution that creates an intermittent air-gapped environment for remote management of a target site from another site. In example embodiments, there are (at least) three sites involved. A first site is a management site. A second site, for instance a cloud site with requirements to prevent data leakage, is a target site to be managed by the first site. The third site is an intermediary site between the first and second site. The second site could reside behind a data boundary or other security boundary relative to the first site. An example such boundary is a jurisdictional boundary formed by a geographical and/or governmental delineation, as an example. In a more specific example, the first site exists on one side of a data boundary, for instance in one country, and the intermediary site and second site exist on another side of a data boundary, for instance in another country.

In accordance with aspects described herein, the data communication link(s) between (i) sites A and B, and (ii) sites B and C are connected via network switch component(s) that are intermittently-connected air-gapped switches. By way of mechanical and control components, these switches sit along wired connections existing between sites that can be physically disconnected or connected such that site B is not connected to both site A and site C at the same time. For instance, a prerequisite to any communication link, for instance a physical, wired communication link, between sites A and B, being connected is that any communication link, for instance a physical, wired communication link, between sites B and C be disconnected so that site B is air-gapped from site C. Air-gapped in this context also means a lack of wireless data communication between components on each side of the air-gap that would otherwise be able to communication data to each other if the air-gap did not exist. In addition, site B can include facilities for staging data communication between sites A and C, and for performing sanity checks and validation that any data communication from site A to site C via site B, or data communication from site C to site A via site B, be legitimate, valid, risk free, and not contain any sensitive data that is not to be provided across a data boundary. This helps to ensure that site A does not provide something dangerous to the target site C in real-time under the guise of legitimate management code, and to help ensure that site C does not leak data that is sensitive or otherwise is not to be leaked across a data boundary, for instance leaked outside of site C and/or across a jurisdictional or other type of boundary.

In an embodiment of aspects described herein, a target site is located within a first country that has strict requirements regarding data retention, security, and boundary protection, requiring that certain maintained data at the target site not leave the first country. For instance, there might be restrictions that require no personal data to leave the country. The first country might, however, not object to updates and other management being performed remotely (e.g., from a remote site outside of the first country), and might allow some data, such as management data in the form of system error logs as an example, to leave the country as long as it does not contain any such sensitive data.

To accomplish aspects described herein, an intermediary system of an intermediary site is used to orchestrate distinct stages that facilitate the management of a target site by a management site. In one stage, the target site (e.g., systems thereof) in the first country runs independently with an air-gap between the target site and the management site residing on the other side of the data boundary (e.g., in a second country). In another stage, the management site is connected to a system within the first country (across the data boundary) other than the target site such that the management site is air-gapped from the target site.

These stages are provided via an intermediary system, for instance one at an intermediary site within the first country, though the intermediary system could, in some examples, be co-located at the target site but with the capability of being air-gapped from system(s) thereof. In any case, the intermediary system is connected to the target site and the management site via a switch component from which network connections, such as wired communication link(s), for instance network cables, are selectively connected and disconnected to air-gap sites from each other, as appropriate. In embodiments, the physical connection/disconnection is being effected by mechanical movement, for instance by way of a mechanical component that physically unplugs cables from, and plugs cables into, one or more network switches. Though logical connection and disconnection, without physical connection and disconnection, such as plugging and unplugging cables, to open or close data communication links may be possible, the visibility of mechanical action to physically connect/reconnect communication links might be important and desired for audit verification and compliance requirements, as examples.

Aspects described herein can provide facilities that conform to compliance and other guidelines or requirements, for instance those promulgated by governmental or other bodies. For instance, embodiments could satisfy standards regarding boundary protection and split tunneling, such as those promulgated by the National Institute of Standards and Technology. Logical disconnections, such as software-based turning off of an Ethernet port in a network switch, do not meet such standards.

Figure 3:
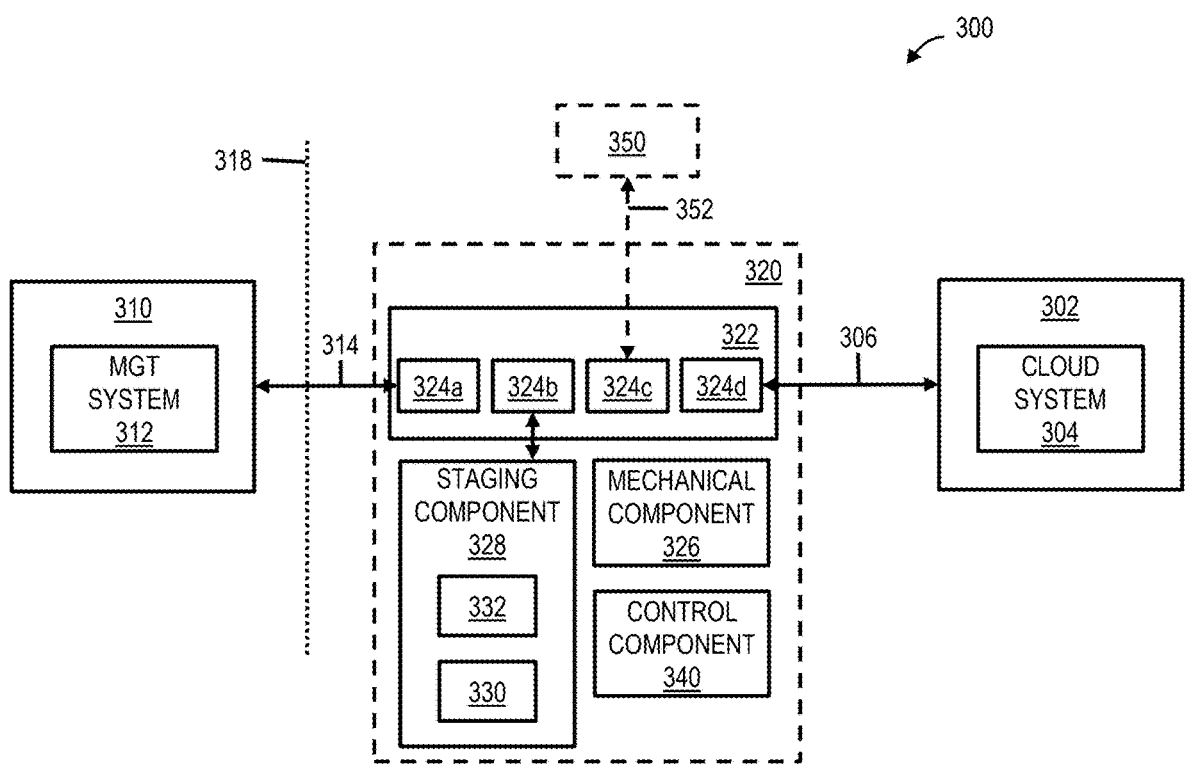
FIG. 3 depicts one embodiment providing air-gapped security for a remote-managed site, in accordance with aspects described herein.

FIG. 3 depicts one embodiment providing air-gapped security for a remote-managed site, in accordance with aspects described herein. Environment 300 includes a first site 310 ('management site') having a management system 312. Environment 300 also includes a second site 302 ('target' site) having a cloud system 304. One goal is for site 310, specifically management system 312 thereof, to manage, at least in part, site 302, specifically cloud system 304 thereof.

Environment 300 also includes an intermediary system 320, referring to a collection of components between the target and management sites 302, 310. In one example, the intermediary system is located at an intermediary site different from the target and management sites 302, 310. In another example, the intermediary system is substantially co-located with the target site 302, but with the capability of being air-gapped therefrom. A boundary 318 exists between the management site 310 and the intermediary system 320, the boundary being a data boundary across which certain data, for instance data of a threshold sensitivity, is prohibited from being passed. The boundary could be any type of boundary imparting restrictions on data communication for management or other purposes across the boundary.

Intermediary system 320 includes a switch component 322 that includes at least one network switch. The switch component 322 includes ports into which cables plug to establish/connect wired communication links between other components. Some such ports are shown here as 324a, 324b, 324c and 324d. Cables can be unplugged to break/disconnect/open wired communication links and air-gap components from each other. In addition, as explained further herein, the intermediary system can be configured such that a prerequisite to connecting a wired communication link between the intermediary system, such as component(s) thereof) to a remote site, such as site 302 or 310, is that the wired communication link(s) to each other remote site be disconnected.

Intermediary system 320 also includes a mechanical component 326 that can physically connect and disconnect the wired communication links between the two endpoints. The mechanical component may reside outside of the switch component 322, such as in this example. When a link is to be in a disconnected mode or state, the mechanical component that includes a mechanical entity, such as a robot or other mechanism, performs mechanical movement to physically disconnect the link so that there is a distinct air-gap in the connection. The control for making or breaking this connection can be done by means of a control component 340 running a software program, for instance one that can be executed by a computer system connected to the mechanical component, as an example.

Intermediary system also includes staging component 328 with storage 330 and verification logic 332. The staging component provides storage 330 for exchange of data, for example updates, log data, and others, between the sites as explained herein to facilitate management activity. Thus, staging component 328 is configured to stage data for communication between the management site 310 and the target site 302 to be managed by the management site. The communication could be data communication in either direction between the sites.

The target site 302 is in data communication with the intermediary system 320 via communication link 306 and the management site 310 is data communication with the intermediary system 320 via communication link 314. Communication links 306, 314 can be or include physical cables/connections that plug into the switch component 322, for instance. Communication link 314 includes a cable/connection that plugs into port 324a and communication 306 includes a cable/connection that plugs into port 324d here. The mechanical component 326 is configured to selectively, physically connect and disconnect wired communication links to and from the switch component 322. Thus, the mechanical component 326 can physically connect and disconnect wired communication link 306 and wired communication link 314 by plugging and unplugging cable(s) thereof.

The control component 340 drives the mechanical component 326 to connect/disconnect link(s) as appropriate, and is therefore configured to operate the mechanical component to perform actions to enable communication between the staging component 328 and a selected site while air-gapping the staging component from other site(s). Specifically, the mechanical component can physically disconnect communication link 314 to air-gap site 310 from site 302 and the staging component 328 or intermediary system more generally as a prerequisite to physically connecting communication link 306 between site 302 and the staging component 328 via the switch component 322. Similarly, the mechanical component can physically disconnect communication link 306 to air-gap site 302 from site 310 and the staging component 328 or intermediary system more generally as a prerequisite to physically connecting communication link 314 between site 310 and the staging component 328 via the switch component 322. In this example, the mechanical component can physically disconnect communication link 306 by unplugging a cable between site 302 and the switch component 322, specifically unplugging a cable plugged into switch port 324d, and can physically disconnect communication link 314 by unplugging a cable between site 310 and the switch component 211, specifically unplugging a cable plugged into switch port 324a. The staging component 328 is connected to the switch component 322 via communication link 334, for instance a cable, plugged into port 324b. Unplugging a cable from port 324a air-gaps site 310 from the rest of the depicted components, and unplugging a cable from port 324d air-gaps site 302 from the rest of the depicted components. Meanwhile, if one such cable is unplugged, the other can be plugged/connected to enable communication between the other site and the staging component via switch component 322. One feature that may be enforced by the control component 340 or another component is that at no point can the intermediary system be connected via switch component 322 to more than one site of sites 302 and 310.

The staging component 328 can be a computer system or any other device providing storage 330. The staging component 328 can facilitate the exchange of data from one site to another site. For instance, the storage can be used to stage data for communication between sites 302 and 310. By way of specific example, based on physical connection of communication link 314 between the site 310 and the staging component 328, the staging component 328 can receive system management code from the management system 312 of site 310 via the link 314 through network component 322. The system management code could include any code for managing the cloud system 304, for instance code in the form of software patches or updates, or any arbitrary software to run at the target site 302, and possibly on the cloud system 304 itself, for performing management activity. In any case, the staging component 328 can perform validation that the system management code is valid and safe for the cloud system 304. This validation could be performed by verification logic 332, which could be installed, highly trusted code configured to verify that staged system management code is valid and safe.

If the system management code is not validated, it can be deleted from the staging component. Any appropriate actions could be taken at that point. If the system management code is validated, then the staging component 328 could perform action(s) to proceed with management of the cloud system 304 using the system management code, but do so only after subsequent physical disconnection of communication link 314 and physical connection of communication link 306.

By way of specific example, when site 310 and system 320 are connected so that management system 312 can communicate data to staging component 328, upgraded software is provided to staging component 328 and stored in storage 330. The staging component 328 performed validation checking on the upgraded software and determines whether it is safe to use the updated software to update a system of the target site. The validation checking can include a series of tests of the software, for instance. In any case, if validated, the intermediary system can disconnect from site 310, connect to site 302, and then update software on cloud system 304 with the upgraded software.

By way of another specific example, based on physical connection of link 306 between site 302 and the staging component 328, the staging component receives management data from cloud system 304, validates (using verification logic 332 or other logic) that the received management data does not exceed a threshold level of sensitivity, and proceeds with provision of the management data to the management system, but does so only after subsequent physical disconnection of communication link 306 and physical connection of communication link 314. The staging component 328, by way of the verification logic or other logic, can perform data sanitation if necessary. Thus, in a situation where the validating checks for sensitive data in the received management data and identifies sensitive data in the management data, the staging component can remove the sensitive data to provide sanitized management data, and provide that sanitized management data to the management system.

It is noted that the staging component 328 could perform a forced cleanup of some or all of the storage 330 after providing data/code therefrom to a receiving site, for instance after the intermediary system disconnects one site and before connecting to another site. In some examples, sites share a space in storage in which systems of each site can access and manipulate data in the shared space. This shared space could be flushed, zeroed, or the like before physical connections to sites are made.

Optionally, additional target sites could be involved. In a specific example, site 302 is just one target site of a collection of target sites to be managed by the management site. Site 350 in FIG. 3 is another target site and has a communication link 352 that can be selectively physically connected/disconnect by way of a cable that plugs into switch port 324c. The control component 340 in this situation may be configured to operate the mechanical component 326 to enforce proper air-gapping. For instance, in an example where management site 310 is to be connected to provide management code, then the control component 340 can operate the mechanical component 326 to physically disconnect the wired communication link 352 to air-gap site 350 from the staging component 328 and the other sites 310, 302 as a prerequisite to physically connecting link 314. Thus, when the management site is to be connected, then all target sites connected to the intermediary system can be air-gapped from the staging component or intermediary system more generally.

In an example where site 350 is to be connected, for instance if management code were provided to the staging component by system 312 for management of site 350, then the control component can operate the mechanical component 326 to, as a prerequisite to physically connecting communication link 352 between site 350 and the staging component 328 via the switch component 322, (i) physically disconnect communication link 314 to air-gap site 310 from site 350 and the staging component 328, and (ii) for each other target site (i.e., site 302 here) physically disconnect link 306 to air-gap site 302 from site 350 and the staging component 328. More generally, if one of the target sites is to be connected, the other target site(s) and the management site are to be air-gapped from the staging component or intermediary system more generally as a prerequisite.

Figure 4:
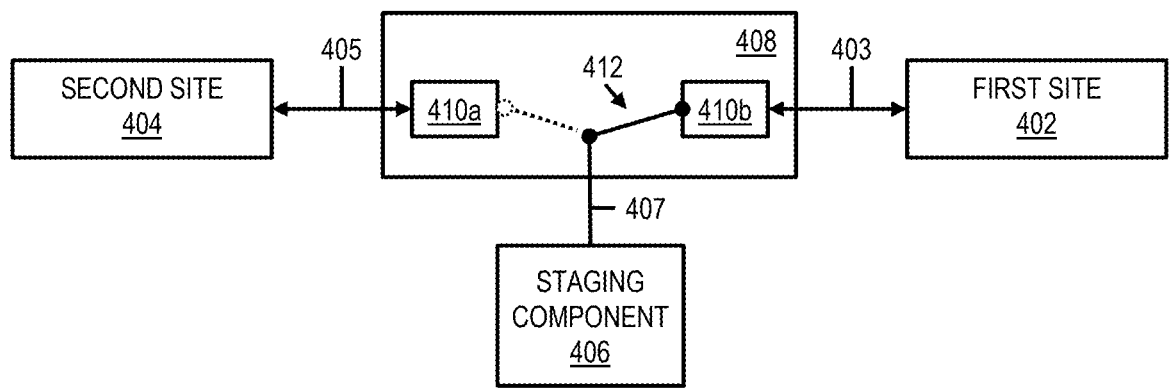
FIG. 4 depicts another embodiment providing air-gapped security for a remote-managed site, in accordance with aspects described herein.

FIG. 4 depicts another embodiment providing air-gapped security for a remote-managed site, in accordance with aspects described herein. Many components described with reference to FIG. 3 could exist in this example, though depictions and descriptions of these are omitted from FIG. 4 to focus on differences between the two examples. Here, first site 402 and second site 404 are connected via links 403 and 405, respectively, to network component 408 of an intermediary system that also includes staging component 406 in communication with network switch component 408 via link 407. In this example, a mechanical component 412 is or includes a switch that has states, where the switch can only be in one state at a time. Here the switch has two states-one state is shown in which a physical connection exists between the staging component and site 402. Another state shown in dotted line is one in which a physical connection exists between the staging component and site 404. The switch 412 is a mechanical toggle in this example, and it is not possible for a simultaneous connection of the staging component 406 to both the first site 402 and the second site 404. Thus, the switch 412 exists to bridge a link between the staging component 406 and just one of the two sites at any given time, since the switch can only be in one of the two (in this example) positions. Either link 405 is necessarily physically disconnected to air-gap site 404 from site 402 and the staging component 406 based on link 403 being physically connected via the switch 412 to the staging component 406, or link 403 is necessarily physically disconnected to air-gap site 402 from site 404 and the staging component 406 based on link 405 being physically connected via the switch 412 to the staging component 406. The switch could have an intermediary state in which neither of the two sites are connected, if desired. Similarly, there could be other target site(s) and other switch state(s) corresponding to those target site(s), if desired.

In a similar embodiment, switch 412 could be implemented by way of link 407, which could be a cable that plugs into (i) a first network port of one network switch into which a cable of link 405 also plugs when communication with site 404 is desired and (ii) a second network port of another network switch into which a cable of link 403 also plugs when communication with site 402 is desired, where the two network switches are air-gapped from each other.

Figure 5:
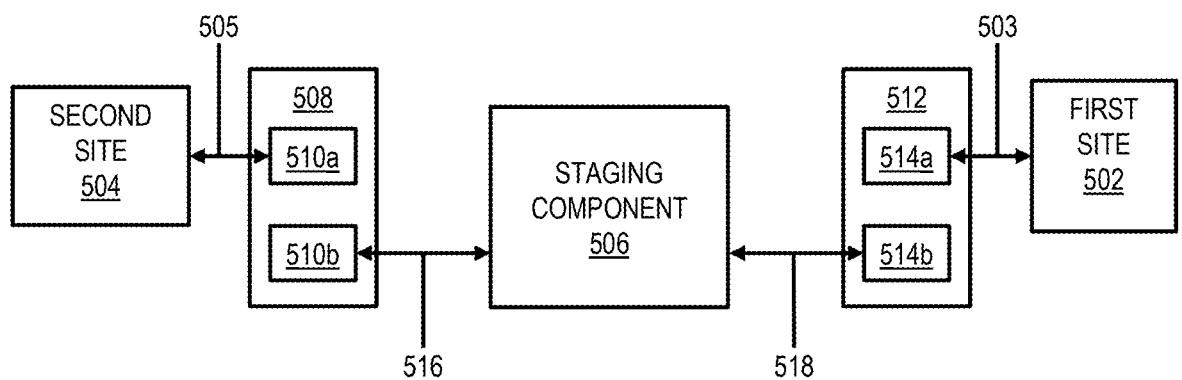
FIG. 5 depicts a further embodiment providing air-gapped security for a remote-managed site, in accordance with aspects described herein.

FIG. 5 depicts a further embodiment providing air-gapped security for a remote-managed site, in accordance with aspects described herein. Many components described with reference to FIG. 3 could exist in this example, though depictions and descriptions of these are omitted from FIG. 5 for clarity and to focus on differences between the two examples.

In the example of FIG. 5, site 502 (e.g. a target site) and site 504 (e.g., a management site) communicate with staging component 506 (of the intermediary system, not separately depicted) via individual network switches. Specifically, the network component encompasses (at least) network switch 508 and network switch 512. Wired communication link 505 between site 504 and the staging component 506 connects with a cable into port 510a of network switch 508, and staging component 506 connects into port 510b of network switch 508 via link 516. Similarly, wired communication link 503 between site 502 and the staging component 506 connects with a cable into port 514a of network switch 512, and staging component 506 connects into port 514b of network switch 512 via link 518. The mechanical component (not pictured) can be configured such that (i) communication link 505 is physically disconnected and air-gaps site 504 from the switch component (e.g. network switch 508 thereof) when wired communication link 503 is physically connected to network switch 512, and (ii) wired communication link 503 is physically disconnected and air-gaps site 502 from the switch component (e.g. network switch 512 thereof) when wired communication link 505 is physically connected to network switch 508. As an alternative, physical disconnection to air-gap a site from the staging component and the other site could instead disconnect link 516 or 518 from switch 508 or 510, respectively. In such an example, separation is provided in part by leveraging a natural air-gap between the two physical network switches and selectively isolating one switch and therefore the site behind it. In either of the above examples, a data communication link between the site and staging component is disconnected to effect the air-gap.

Figure 6:
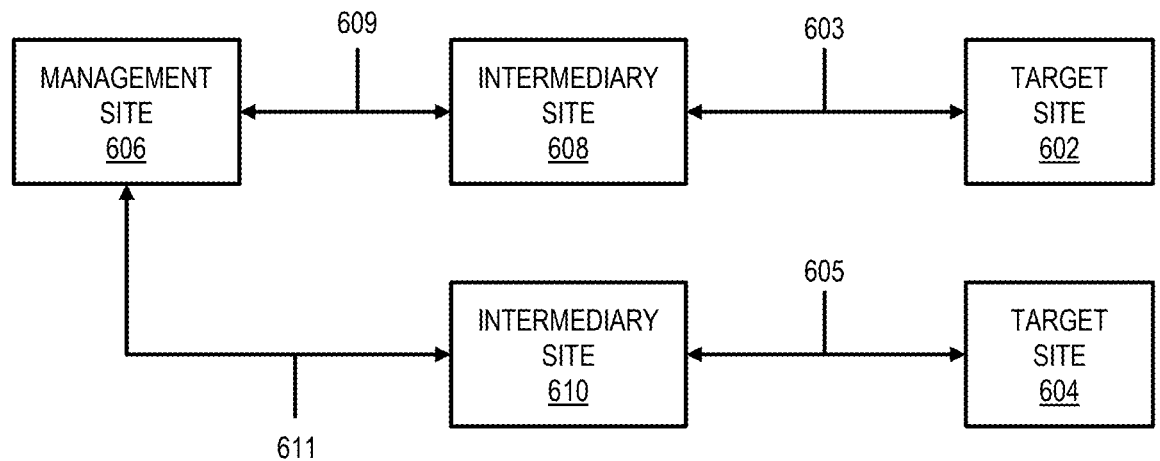
FIG. 6 depicts yet another embodiment providing air-gapped security for a remote-managed site, in accordance with aspects described herein.

FIG. 6 depicts yet another embodiment providing air-gapped security for a remote-managed site, in accordance with aspects described herein. For simplicity, FIG. 6 indicates only sites and communication links therebetween. In this example, target sites 602 and 504 are controlled by one or more entities, and could reside within a same boundary of protection, e.g., jurisdiction, data boundary, or the like, or different boundaries of protection. A goal is for management site 606 to manage sites 602 and 604, for instance to provide code/patches from site 606 to sites 602 and 604, and/or to receive, at site 606, data from sites 602 and 604. Thus, there are multiple target sites (602, 604) in this scenario. In an alternative, sites 602 and 604 are part of a single site but are to remain in different boundaries of protection, for instance in a multi-tenant cloud scenario.

Sites 608 and 610 are different intermediary sites, which are representative of intermediary systems between the management site and a target site. Intermediary site 608 sits between management site 606 and site 602, with site 606 being in communication with site 608 via communication link 609 and site 602 being in communication with site 608 via communication link 603. Intermediary site 610 sits between management site 606 and site 604, with site 606 being in communication with site 610 via communication link 611 and site 604 being in communication with site 610 via communication link 605.

A prerequisite to connecting management site 606 to site 608 may be disconnection of link 603 as described herein. It may also be required to disconnect link 611 between sites 606 and 610. Similarly, a prerequisite to connecting management site 606 to site 610 may be disconnection of link 605 as described herein. It may also be required to disconnect link 609 between sites 606 and 608.

In this example, if one target site (602, 604) is to communicate data to site 606 via its intermediary site, then a prerequisite to connecting the target site to its intermediary site is to disconnect the link between the management site 606 and the intermediary site. Thus, a prerequisite to connecting 602 to site 608 may be disconnection of link 609, and a prerequisite to connecting 604 to site 610 may be disconnection of link 611. After the data is provided to the intermediary site and verified, then the intermediary site can be connected to the management site. However, a prerequisite to this connection is to disconnect the intermediary site from the target site. Additionally, any other connection(s) that the management site has to other site(s) may need to be disconnected. In the example of FIG. 6, after site 602 has provided data to site 608 for conveyance to site 606, link 603 is disconnected before connecting link 609. Also, link 611 is to be disconnected before connecting link 609. This air-gaps site 606 from site 610 and air-gaps site 608 from site 602. Similarly, after site 604 has provided data to site 610 for conveyance to site 606, link 605 is disconnected as described herein before connecting link 611. Also, link 609 is to be disconnected before connecting link 611. This air-gaps site 606 from site 608 and air-gaps site 610 from site 604.

FIG. 6 depicts an example in which the intermediary system of the intermediary site is not shared between the target sites. However, sharing of the intermediary system is possible, as described above with reference to FIG. 3. In that example, only one communication link between site 606 and the single intermediary system is needed. A first communication link between site 602 and the intermediary system and a second communication link between site 604 and the intermediary system could be selectively connected and disconnected, with a maximum of one of them being connected to the intermediary system at a time, to provide communication between those target sites and the intermediary system when needed.

In a specific embodiment, mechanical component(s) of the intermediary system(s) involved can be controlled in a manner such that a maximum of one of links 603, 605, 611 and 609 may be connected at any given time. In other words, the links can be gates such that any time one such gate is to be closed, the others are to be opened, if not already opened, as a prerequisite to the closing.

Accordingly, aspects described herein provide for selective physical connection and disconnection of communication links from a switch component to selectively provide airgaps between sites. This can be accomplished by a mechanical component using mechanical movement to connect/disconnect network cables to appropriate receptacles (e.g., switch ports) of network switch(es) of the switch component. In some aspects, an intermediary system with a switch component is provided to maintain air-gaps between different systems/sites, in which a mechanical component is provided to plug and unplug cables into/out of the switch component and a software control component is provided to guide the operation of the mechanical component. Further provided in an example embodiment is a method to maintain remote management in sovereign cloud environments, which method includes selective connection of an intermediary site to either the sovereign cloud site or the remote management site using air-gapped network switches of a switch component, and sanitation/validation, by the intermediary site, of any data that moves between the remote management site and the sovereign cloud site via the air-gapped network switches.

Figure 7:
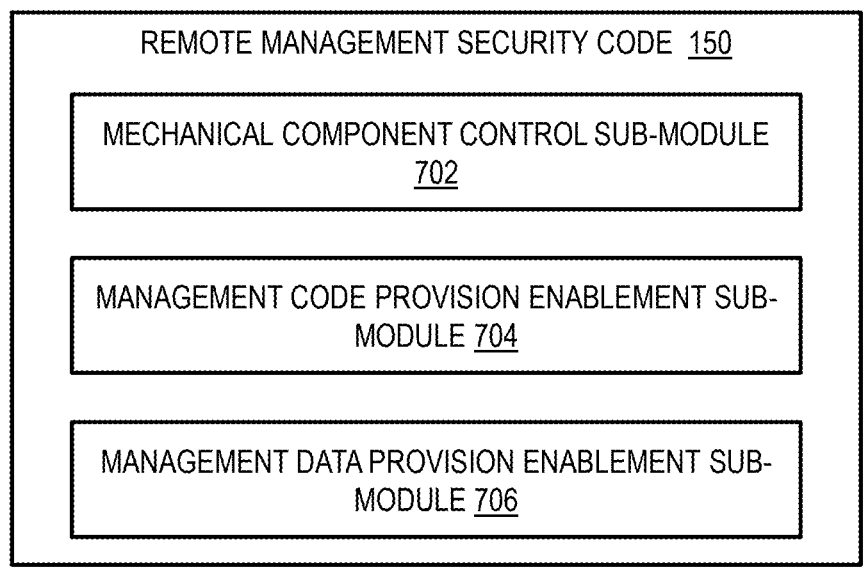
FIG. 7 depicts further details of example remote management security code to incorporate and/or use aspects described herein.

FIG. 7 depicts further details of example remote management security code (e.g., remote management security code 150 of FIG. 1) to incorporate and/or use aspects described herein. The code 150 could be executed to provide, or perform actions by, a control component as described herein. In one or more aspects, remote management security code 150 includes, in one example, various sub-modules to be used to perform control for air-gapped security for remote-managed sites. The sub-modules are, e.g., computer readable program code (e.g., instructions) in computer readable media, e.g., storage (persistent storage 113, cache 121, storage 124, other storage, as examples). The computer readable storage media may be part of one or more computer program products and the computer readable program code may be executed by and/or using one or more computing devices (e.g., one or more computers, such as computer(s) 101, computers of cloud 105/106, and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute one or more of the sub-modules and/or portions thereof. Many examples are possible.

Referring to FIG. 7, remote management security code 150 includes mechanical component control sub-module 702 for controlling a mechanical component of an intermediary site between a first site and a second site to selectively, physically connect and disconnect wired communication links to and from a switch component of the intermediary site; management code provision enablement sub-module 704 for enabling provision of system management code from a management system of the second site to a cloud system of the first site; and management data provision enablement sub-module 706 for enabling provision of management data from the cloud system to the management system.

Figure 8:
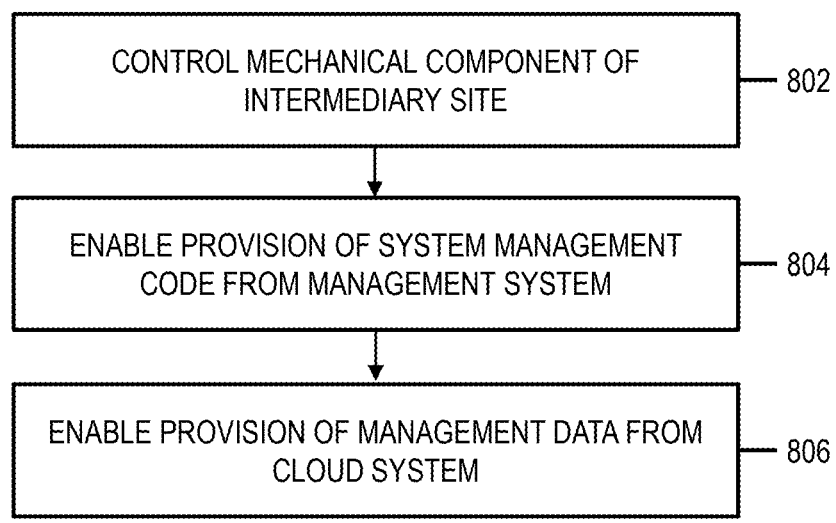
FIG. 8 depicts an example process for air-gapped security for remote-managed sites, in accordance with aspects described herein.

Further details of these sub-modules are explained with reference to FIG. 8. FIG. 8 depicts an example process for air-gapped security for remote-managed sites, in accordance with aspects described herein. The process may be executed, in one or more examples, by a processor or processing circuitry of one or more computers/computer systems, such as those described herein, and more specifically those described with reference to FIG. 1. In one example, code or instructions implementing the process(es) of FIG. 7 are part of a module, such as module 150. In other examples, the code may be included in one or more modules and/or in one or more sub-modules of the one or more modules. Various options are available. The method be performed by an intermediary system as described herein, for instance in whole or in part a control component, for example.

The process of FIG. 8 includes controlling (802) a mechanical component of the intermediary site between a first site and a second site to selectively, physically connect and disconnect wired communication links to and from a switch component of the intermediary site. As part of this, the method enables (804) provision of system management code from a management system of the second site to a cloud system of the first site. This can be enabled by a combination of (i) controlling the mechanical component to physically disconnect a first wired communication link and air-gap the first site from the second site and a staging component of the intermediary site, and physically connect a second wired communication link between the second site and the staging component via the switch component, and (ii) based on provision of the system management code from the management system to the staging component, controlling the mechanical component to physically disconnect the second wired communication link and air-gap the second site from the first site and the staging component, and physically connect the first wired communication link, which is between the first site and the staging component via the switch component, for provision of the system management code to the cloud system.

Further, the method enables (806) provision of management data from the cloud system to the management system. This can be enabled by a combination of (i) controlling the mechanical component to physically disconnect the second wired communication link and air-gap the second site from the first site and the staging component, and physically connect the first wired communication link between the first site and the staging component via the switch component, and (ii) based on provision of the management data from the cloud system to the staging component, controlling the mechanical component to physically disconnect the first wired communication link and air-gap the first site from the second site and the staging component, and physically connect the second wired communication link between the second site and the staging component via the switch component for provision of the management data to the management system.

In addition, the staging component can perform actions based on receiving the management code. For instance, the method can include receiving the system management code from the management system, and validating that the system management code is valid and safe for the cloud system.

Controlling the mechanical component to physically disconnect the second wired communication link and physically connect the first wired communication link can then be performed based on the validating, i.e., only if the system management code is validated as being valid and safe for the cloud system.

The staging component can also perform actions based on receiving the management code. For instance, the method can include receiving the management data from the cloud system, and validating that the received management data does not exceed a threshold level of sensitivity. Controlling the mechanical component to physically disconnect the first wired communication link and physically connect the second wired communication link can then be performed based on the validating, i.e., only if the management data is validated as not exceeding a threshold level of sensitivity, as an example.

In an embodiment, the mechanical component can physically connect and disconnect the first wired communication link and the second wired communication link by plugging and unplugging at least one cable. In another embodiment, the mechanical component physically disconnects the first wired communication link by unplugging a first cable between the first site and the switch component, and physically disconnects the second wired communication link by unplugging a second cable between the second site and the switch component.

In some embodiments, the first site is one target site of a collection of target sites to be managed by the second site, and the method further includes operating the mechanical component to, for each other target site of the collection of target sites, physically disconnect a respective wired communication link to air-gap the other target site from the first site and the staging component as a prerequisite to physically connecting the second wired communication link. Further, the method can include operating the mechanical component to, as a prerequisite to physically connecting a wired communication link between another target site, of the collection of target sites, and the staging component via the switch component, the another target site being different from the first site: physically disconnect the second wired communication link to air-gap the second site from the another target site and the staging component, and for each other target site, of the collection of target sites, other than the another target site, physically disconnect a respective wired communication link to air-gap the other target site from the another target site and the staging component.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. An intermediary system comprising:
   a switch component comprising at least one network switch;
   a staging component configured to stage data for communication between a first site, as a management site, and second site, as a target site to be managed by the management site;
   a mechanical component configured to selectively, physically connect and disconnect wired communication links to and from the switch component; and
   a control component configured to operate the mechanical component to:
      physically disconnect a first wired communication link to air-gap the first site from the second site and the staging component as a prerequisite to physically connecting a second wired communication link between the second site and the staging component via the switch component; and
      physically disconnect the second wired communication link to air-gap the second site from the first site and the staging component as a prerequisite to physically connecting the first wired communication link between the first site and the staging component via the switch component.

2. The intermediary system of claim 1, wherein the staging component comprises storage for staging the data for communication between the first site and the second site, wherein the first site comprises a cloud system and the second site comprises a management system for managing the cloud system, and wherein the staging component is configured to perform at least one selected from the group consisting of:
   based on physical connection of the second wired communication link between the second site and the staging component, receiving system management code from the management system of the second site, validating that the system management code is valid and safe for the cloud system, and proceed with management of the cloud system using the system management code based on subsequent physical disconnection of the second wired communication link and physical connection of the first wired communication link; and
   based on physical connection of the first wired communication link between the first site and the staging component, receiving management data from the cloud system of the first site, validating that the received management data does not exceed a threshold level of sensitivity, and proceed with provision of the management data to the management system based on subsequent physical disconnection of the first wired communication link and physical connection of the second wired communication link.

3. The intermediary system of claim 2, wherein the validating that the system management code is valid and safe for the cloud system comprises performing one or more tests with the system management code and determining, based on results of the one or more tests, that the system management code is valid and safe.

4. The intermediary system of claim 2, wherein the validating that the received management data does not exceed a threshold level of sensitivity comprises checking for sensitive data in the received management data and, based on identifying sensitive data in the management data, removing the sensitive data to provide sanitized management data, wherein provision of the management data to the management system provides the sanitized management data to the management system.

5. The intermediary system of claim 1, wherein the mechanical component physically connects and disconnects the first wired communication link and the second wired communication link by plugging and unplugging at least one cable.

6. The intermediary system of claim 5, wherein the mechanical component physically disconnects the first wired communication link by unplugging a first cable between the first site and the switch component, and physically disconnects the second wired communication link by unplugging a second cable between the second site and the switch component.

7. The intermediary system of claim 1, wherein the second site is one target site of a collection of target sites to be managed by the management site, and wherein the control component is further configured to operate the mechanical component to, for each other target site of the collection of target sites, physically disconnect a respective wired communication link to air-gap the other target site from the first site and the staging component as a prerequisite to physically connecting the first wired communication link.

8. The intermediary system of claim 7, wherein the control component is further configured to operate the mechanical component to, as a prerequisite to physically connecting a wired communication link between another target site, of the collection of target sites, and the staging component via the switch component, the another target site being different from the second site:
 physically disconnect the first wired communication link to air-gap the first site from the another target site and the staging component; and
 for each other target site, of the collection of target sites, other than the another target site, physically disconnect a respective wired communication link to air-gap the other target site from the another target site and the staging component.

9. The intermediary system of claim 1, wherein the at least one network switch of the switch component comprises a first network switch into which the first wired communication link connects and a second network switch into which the second wired communication link connects, and wherein the mechanical component is configured such that the first wired communication link is physically disconnected and air-gaps the first site from the switch component when the second wired communication link is physically connected to the second network switch, and the second wired communication link is physically disconnected and air-gaps the second site from the switch component when the first wired communication link is physically connected to the first network switch.

10. The intermediary system of claim 1, wherein the mechanical component comprises a switch having states in which:
 the first wired communication link is necessarily physically disconnected to air-gap the first site from the second site and the staging component based on the second communication link being physically connected via the switch; and
 the second wired communication link is necessarily physically disconnected to air-gap the second site from the first site and the staging component based on the first communication link being physically connected via the switch.

11. A computer-implemented method comprising:
controlling a mechanical component of an intermediary site between a first site and a second site to selectively, physically connect and disconnect wired communication links to and from a switch component of the intermediary site;
enabling provision of system management code from a management system of the second site to a cloud system of the first site by:
 controlling the mechanical component to physically disconnect a first wired communication link and air-gap the first site from the second site and a staging component of the intermediary site, and physically connect a second wired communication link between the second site and the staging component via the switch component; and
 based on provision of the system management code from the management system to the staging component, controlling the mechanical component to physically disconnect the second wired communication link and air-gap the second site from the first site and the staging component, and physically connect the first wired communication link, the first wired communication link being between the first site and the staging component via the switch component, for provision of the system management code to the cloud system; and
enabling provision of management data from the cloud system to the management system by:
 controlling the mechanical component to physically disconnect the second wired communication link and air-gap the second site from the first site and the staging component, and physically connect the first wired communication link between the first site and the staging component via the switch component; and
 based on provision of the management data from the cloud system to the staging component, controlling the mechanical component to physically disconnect the first wired communication link and air-gap the first site from the second site and the staging component, and physically connect the second wired communication link between the second site and the staging component via the switch component for provision of the management data to the management system.

12. The method of claim 11, wherein the method further comprises:
receiving the system management code from the management system;
validating that the system management code is valid and safe for the cloud system; and
wherein the controlling the mechanical component to physically disconnect the second wired communication link and physically connect the first wired communication link is performed based on the validating.

13. The method of claim 11, wherein the method further comprises:
receiving the management data from the cloud system; and
validating that the received management data does not exceed a threshold level of sensitivity;

wherein the controlling the mechanical component to physically disconnect the first wired communication link and physically connect the second wired communication link is performed based on the validating.

14. The method of claim 11, wherein the mechanical component physically connects and disconnects the first wired communication link and the second wired communication link by plugging and unplugging at least one cable.

15. The method of claim 11, wherein the mechanical component physically disconnects the first wired communication link by unplugging a first cable between the first site and the switch component, and physically disconnects the second wired communication link by unplugging a second cable between the second site and the switch component.

16. The method of claim 11, wherein the first site is one target site of a collection of target sites to be managed by the second site, and wherein the method further comprises operating the mechanical component to, for each other target site of the collection of target sites, physically disconnect a respective wired communication link to air-gap the other target site from the first site and the staging component as a prerequisite to physically connecting the second wired communication link.

17. The method of claim 16, wherein the control component is further configured to operate the mechanical component to, as a prerequisite to physically connecting a wired communication link between another target site, of the collection of target sites, and the staging component via the switch component, the another target site being different from the first site:
  physically disconnect the second wired communication link to air-gap the second site from the another target site and the staging component; and
  for each other target site, of the collection of target sites, other than the another target site, physically disconnect a respective wired communication link to air-gap the other target site from the another target site and the staging component.

18. A computer program product comprising:
  a set of one or more computer readable storage media; and
  program instructions, collectively stored in the set of one or more computer readable storage media, for causing at least one computing device to perform computer operations including:
    controlling a mechanical component of an intermediary site between a first site and a second site to selectively, physically connect and disconnect wired communication links to and from a switch component of the intermediary site;
    enabling provision of system management code from a management system of the second site to a cloud system of the first site by:
      controlling the mechanical component to physically disconnect a first wired communication link and air-gap the first site from the second site and a staging component of the intermediary site, and physically connect a second wired communication link between the second site and the staging component via the switch component; and
      based on provision of the system management code from the management system to the staging component, controlling the mechanical component to physically disconnect the second wired communication link and air-gap the second site from the first site and the staging component, and physically connect the first wired communication link, the first wired communication link being between the first site and the staging component via the switch component, for provision of the system management code to the cloud system; and
    enabling provision of management data from the cloud system to the management system by:
      controlling the mechanical component to physically disconnect the second wired communication link and air-gap the second site from the first site and the staging component, and physically connect the first wired communication link between the first site and the staging component via the switch component; and
      based on provision of the management data from the cloud system to the staging component, controlling the mechanical component to physically disconnect the first wired communication link and air-gap the first site from the second site and the staging component, and physically connect the second wired communication link between the second site and the staging component via the switch component for provision of the management data to the management system.

19. The computer program product of claim 18, wherein the operations further include:
  receiving the system management code from the management system;
  validating that the system management code is valid and safe for the cloud system; and
  wherein the controlling the mechanical component to physically disconnect the second wired communication link and physically connect the first wired communication link is performed based on the validating.

20. The computer program product of claim 18, wherein the operations further include:
  receiving the management data from the cloud system; and
  validating that the received management data does not exceed a threshold level of sensitivity;
  wherein the controlling the mechanical component to physically disconnect the first wired communication link and physically connect the second wired communication link is performed based on the validating.

* * * * *